T. M. HARRIGAN.
COUPLING FOR THE OPERATING CHAINS OF LIGHTING APPARATUS; &c.
APPLICATION FILED APR. 23, 1910.
974,567.
Patented Nov. 1, 1910.
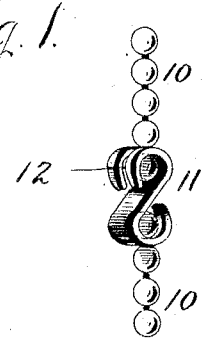
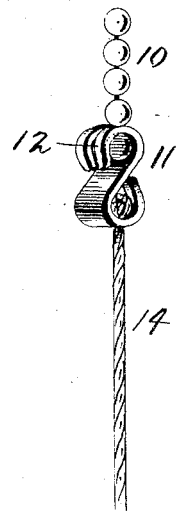
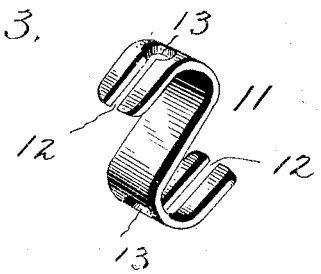

UNITED STATES PATENT OFFICE.

THOMAS M. HARRIGAN, OF WOODSTOCK, VERMONT.

COUPLING FOR THE OPERATING-CHAINS OF LIGHTING APPARATUS, &c.

974,567.

Specification of Letters Patent.

Patented Nov. 1, 1910.

Application filed April 23, 1910. Serial No. 557,226.

*To all whom it may concern:*

Be it known that I, THOMAS M. HARRIGAN, of Woodstock, in the county of Windsor, and in the State of Vermont, have invented a certain new and useful Improvement in Couplers for the Operating-Chains of Lighting Apparatus, &c., and do hereby declare that the following is a full, clear, and exact description thereof.

My invention relates to the pendent chains employed to operate valves of gas burners and the sparking device of electric gas lighters and the switches of electric lamps, and my object is to provide a splice or coupling device by which such chains may be lengthened or repaired when broken, which will combine the important characteristics of simplicity of construction and facility of application, and neatness or good appearance, and to this end my invention consists in the coupler having the characteristics substantially as hereinafter specified and claimed.

In the accompanying drawings: Figure 1 is a perspective view of a pendent chain with parts or sections thereof joined by one of my couplers; Fig. 2 is a similar view showing a portion of a pendent chain and a cord or string connected by one of my couplers; and Fig. 3 is a detail view in perspective and on an enlarged scale of one of my couplers before its application in use.

The pendent chain for which my invention has been specifically adapted consists of a series of bead-like balls 10 flexibly joined together, and my coupler 11 is so constructed that it forms a seat or socket for the link of adjoining portions or sections of a chain, said coupler consisting of a strip of flexible or easily bent sheet metal in the form of a letter S, each end portion of which has a slit or slot 12 that extends from the extremity of the end portion inward, the slit or slot being rounded or enlarged at its inner end at 13. It will thus be seen that each end of the coupler being forked may be slipped between the adjoining beads or links of the chain so that the connecting member between two links will occupy the enlarged rounded inner end of the slit or slot and the outermost bead or link seated in the curve or bend of the coupler and the free projecting end of the coupler may be bent toward the intermediate portion of the coupler so as thereby closely to confine and hold the bead or link, the coupler in this condition being as illustrated in Figs. 1 and 2. As illustrated in Fig. 3, before the coupler is applied, the free ends are sufficiently spaced from the intermediate, unslotted portion of the coupler to enable the ready passage of the chain bead or link into its seat.

As shown in Fig. 2, besides connecting two sections of chain together, a section of chain and a cord or string 14 may be connected together, a knot being provided on the end of the cord to occupy the seat or socket formed by the bend of the coupler. It will be seen that, should a portion of insulation between the part of the pendant that is to be caught by the hand and the metallic chain be desired, my coupler readily admits of this being done, because the string or cord illustrated in Fig. 2 may be of insulating material.

Having thus described my invention, what I claim is:

1. In a device of the class described, a strip of flexible material having reverse bends at opposite ends, each of said ends being slotted from its extremity inward, the slotted end portions lying contiguous to the intermediate connecting portion and forming therewith a retaining seat or socket.

2. The combination of two parts to be joined, each having an enlargement, and a strip of flexible material having reversed bends at opposite ends, each of said ends being slotted from its extremity inward, the slotted portions being contiguous to the intermediate body portion and each forming therewith a holding seat or socket in which the enlargement of one of the parts to be joined is seated, the portion of said part to be joined contiguous to its enlargement passing through the slot.

In testimony that I claim the foregoing I have hereunto set my hand.

THOMAS M. HARRIGAN.

Witnesses:
F. W. WILDER,
H. C. CUSHING.